Figure 1:
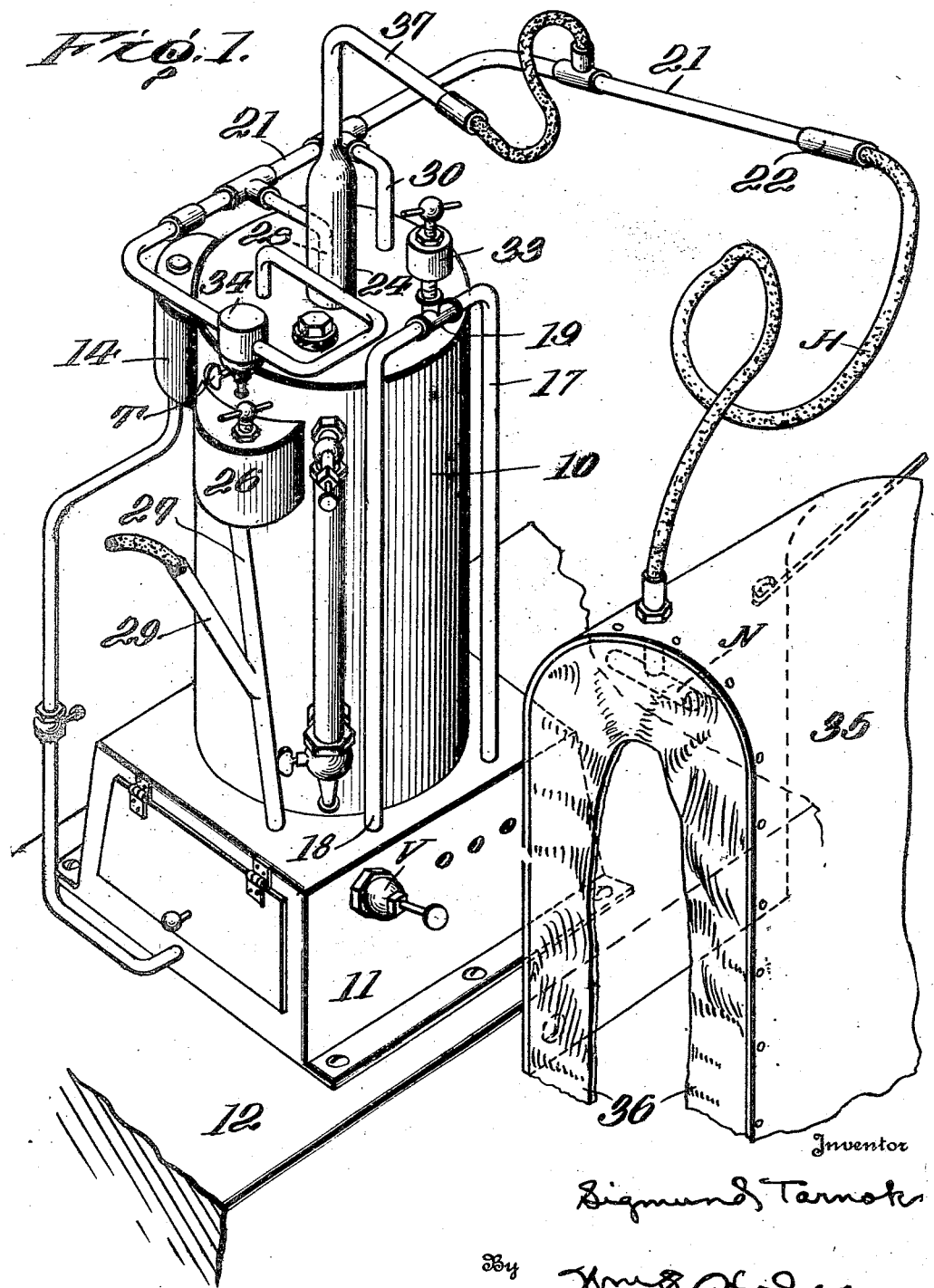

Oct. 28, 1924.

S. TARNOK

APPARATUS FOR FUMIGATING TREES, PLANTS, AND OTHER VEGETATION

Filed Aug. 15, 1923

Patented Oct. 28, 1924.

1,513,137

UNITED STATES PATENT OFFICE.

SIGMUND TARNOK, OF MACON, GEORGIA, ASSIGNOR, BY MESNE ASSIGNMENTS, TO TARNOK, INC., A CORPORATION OF LOUISIANA.

APPARATUS FOR FUMIGATING TREES, PLANTS, AND OTHER VEGETATION.

Application filed August 15, 1923. Serial No. 657,631.

*To all whom it may concern:*

Be it known that I, SIGMUND TARNOK, a citizen of the United States, residing at Macon, in the county of Bibb and State of Georgia, have invented a new and useful Apparatus for Fumigating Trees, Plants, and Other Vegetation, of which the following is a specification.

This invention pertains to the art of treating trees, plants and other growing vegetation, for the purpose of eliminating those agents of nature which normally tend to destroy them, and to also enable them to overcome the destructive effects of such agents.

It is well known that all living plants obtain their nourishment from the air and soil, through minute cells or pores in their leaves, bark, tissues, and roots. From the air they absorb gaseous substances such as oxygen, hydrogen, and carbonaceous gases. From the earth they absorb water through their roots. For instance, a leaf of cotton has from 4500 to 5000 cells per square inch.

It is also well known that most insects, bugs, weevils, caterpillars and worms are not provided with nasal passages, but breathe through pores or cells in the body. The body of a bug of the boll-weevil type, for example, is provided with from 3000 to 5000 of such cells or pores.

Like humans and animals, insects and plants alike strive for nourishment, light, heat and protection. Throughout the span of life plants are constantly subjected to the destructive action of certain agents of nature such as insects, bugs, weevils, borers, caterpillars, worms, fungus and various bacteria, which, if unrestrained, will curtail production by their injurious onslaughts on the plants, buds, blossoms and fruit. A single well known specific instance is the widespread yearly damage to cotton crops by the boll weevil.

One of the objects of the invention is to provide a simple method of fumigating trees, plants and other vegetation, with a suitable chemical which will be inhaled into the pores of the insect body, causing instant death, said chemical being of a character which will not injure the plants being treated. A further object is to employ a chemical which may be absorbed by the plant with safety, and which will serve as a plant food and also act as a resistant inoculation against further onslaughts of the destroying agents. A further object is to destroy insect life by causing a substance to adhere to the plants, which substance will not harm the latter, but possesses hydrogen, which in presence of moisture, such as rain or dew, will combine with the oxygen given off by the plants, and emit odors fatal to insect life. A further object is to provide a simple and inexpensive apparatus by means for which chemicals of the character referred to may be effectually mixed and applied to trees, plants and growing vegetation generally.

The invention will be hereinafter fully set forth and particularly pointed out in the claims.

In the accompanying drawings:—

Figure 2:
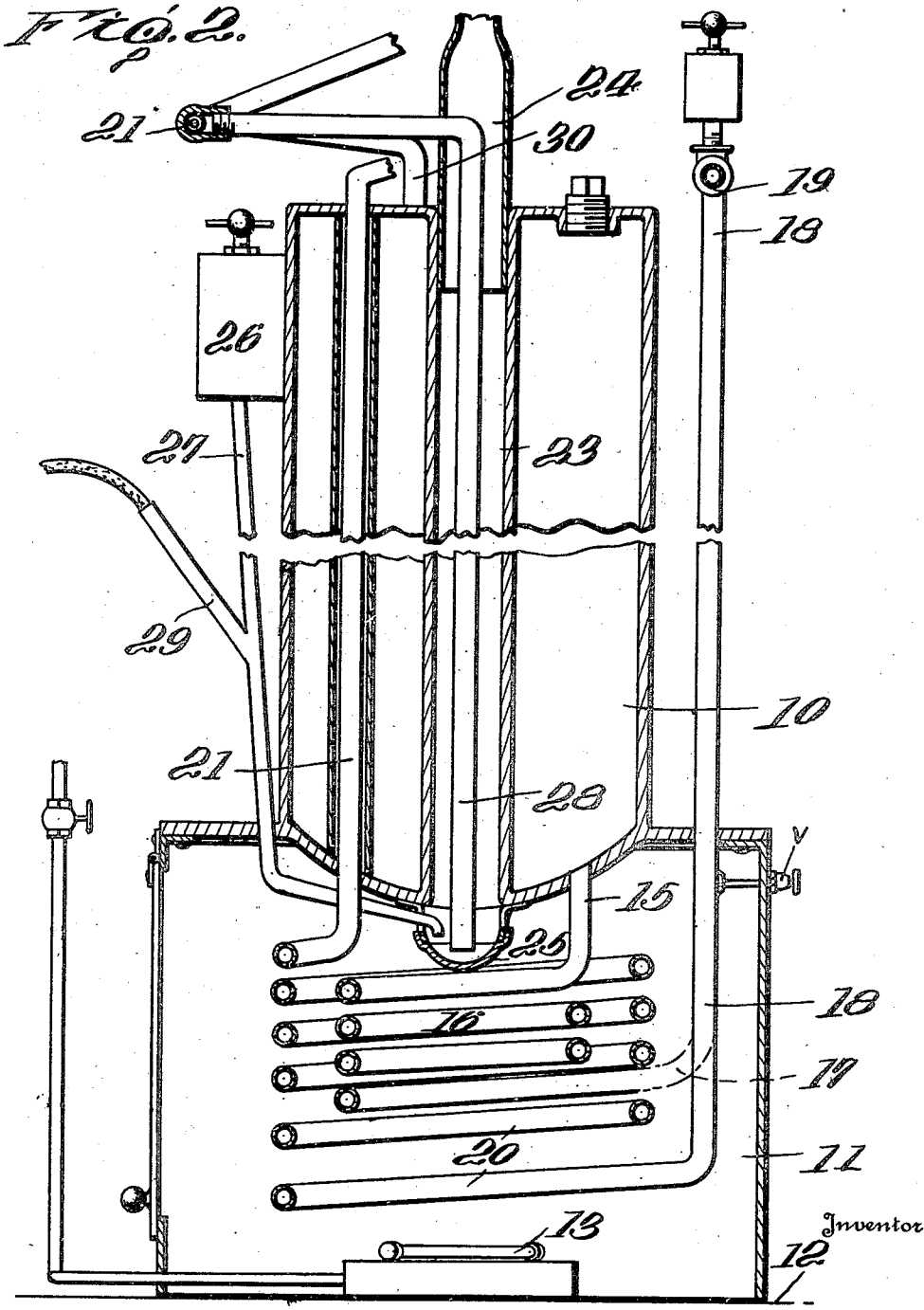
Figure 3:
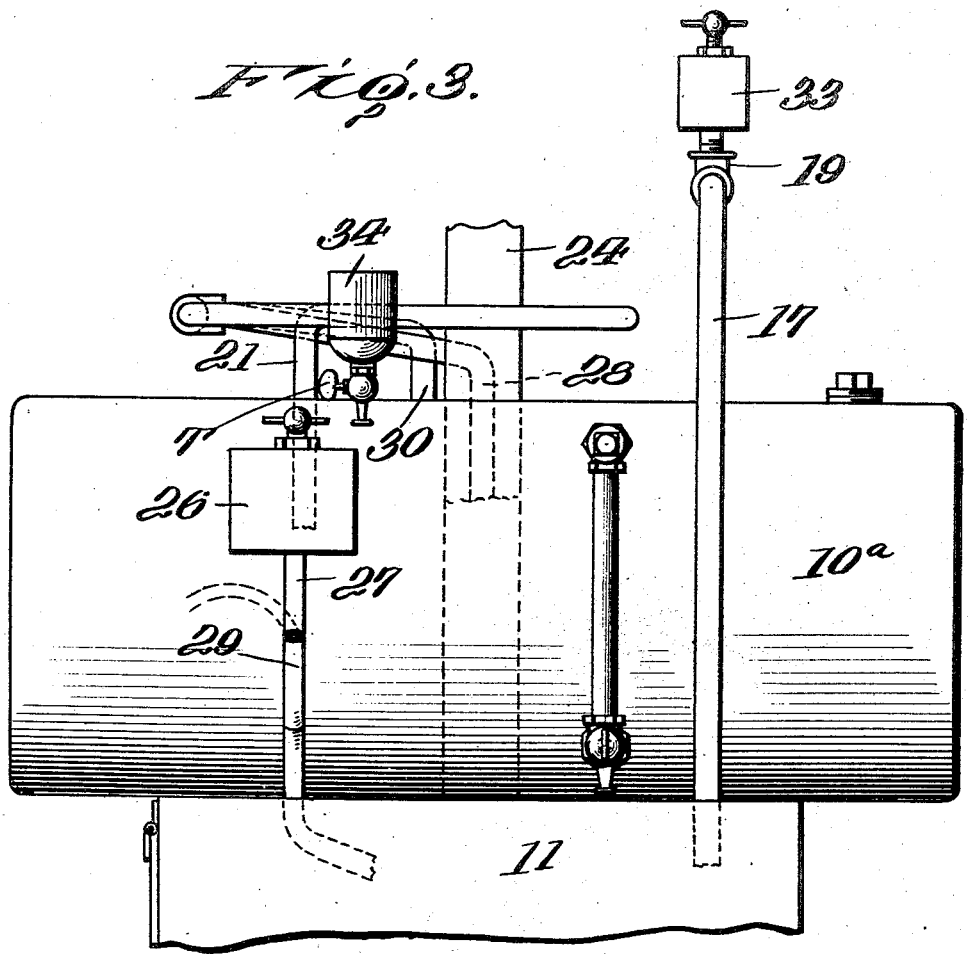
Figure 4:
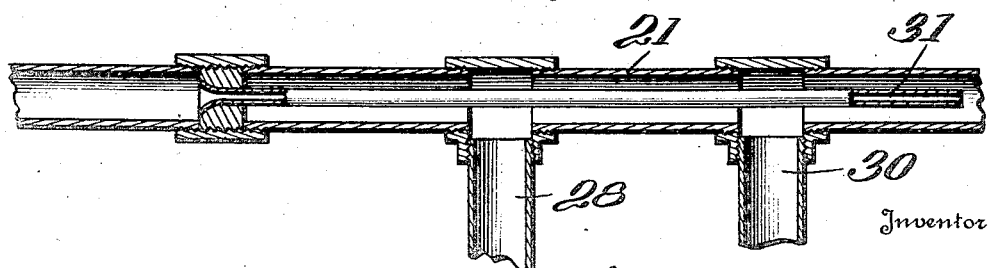

Figure 1 is a diagrammatic perspective view illustrating an apparatus constructed in accordance with the invention. Figure 2 is a longitudinal sectional view thereof. Figure 3 is a side elevation illustrating a slight modification. Figure 4 is a detail view illustrating the steam accelerating device.

Referring to the drawings, 10 designates a water tank, preferably of cylindrical shape, supported upon a fire box 11, which in turn is carried by a platform 12, mounted on any desired type of conveyance, such for instance as a truck. Located within the fire box 11 is a burner 13, which is fed from a tank 14, attached to the exterior of the water tank. Leading from the bottom of the water tank 10, is a water outlet pipe 15, provided with a coiled portion 16, immediately above the burner 13. A hot water pipe 17 leads from said coil and extends above the water level in the tank 10, being joined with a fumigator-mixing pipe 18, by means of a short pipe section 19. The flow of water is controlled by a valve V. The pipe 18 is formed into a fumigator coil 20 located above the burner 13, and preferably surrounding the coil 16. Extending upwardly from the coil 20 is a fumigator discharge pipe 21, preferably leading through the boiler, and extended from the latter to a coupling 22, to which a nozzle N may be connected by means of a nose H.

As shown, the tank 10 is provided with a central bore 23, through which extends an escape pipe 24, for the outlet of the hot air and products of combustion from the burner 13. Extending across the bottom of the bore or chamber 23 is a vaporizing cup 25, positioned to be heated by the burner 13, and receiving a constant supply of fumigating material from a tank 26, through the medium of a pipe 27. Said cup is so supported that products of combustion and heat currents from the burner 13 may pass around the cup into the bore 23 and escape pipe 24. The smoke or smudge-like fumes generated in the receptacle 25 are carried off by a fumes pipe 28, extending longitudinally through the hot air escape pipe 24, and provided with a lateral branch by means of which it may be connected with the fumigator-discharge 21. If desired, compressed air from any suitable source may be introduced into the pipe 27 through the branch pipe 29. The fumigator discharge pipe 21 is provided with a drain pipe 30, leading to the tank 10 above the water level thereof, thereby providing for collection and disposal of condensation.

Within the fumigator-discharge pipe 21 is a reduced nozzle or ejector construction 31, contiguous to the point where said pipe is joined by fumes pipe 28. The inlet end of the ejector is mounted in a plug which extends entirely across the steam pipe so that all steam generated by the apparatus must pass through said nozzle. By means of this construction, the velocity of the chemical laden steam increases as it passes through the ejector, creating a suction which acts as a pump to draw the fumes through the pipe 28 into the steam pipe 21, and to discharge the same at the nozzle 22.

The chemical tank 26 is designed primarily to receive a plant-food material which will form an oily smudge to be introduced into the steam pipe, but other chemicals may be introduced at this point, if desired. A container 33 is mounted on the cross pipe 19, to introduce an insecticide into the steam pipe, and if desired an additional chemical container 34 may be placed in communication with the fumigator-discharge pipe 21, and employed to introduce a chemical which will adhere to the plants and emit an odor noxious to insects when moistened.

Secured to the base 12 in any desired manner, is a hood 35 positioned to enclose the nozzle 22, and shaped to travel over the growing plants, so as to retain the chemical-laden vapor discharged by the nozzle in close proximity to the plants, thereby insuring effective operation. It is preferred to provide the ends of the hood with fabric curtains 36, to prevent escape of the fumes.

The pipe 24 is provided with a reduced outlet, discharging into a pipe 37 which is connected by a flexible pipe 37* with the fumigator-discharge pipe 21 by means of a suitable coupling, as shown.

In operation, the tank 10 is filled to the proper level with water, which flows down through the coil 16, and up into the pipe 17, to the same level as that of the water within the tank. The burner 13 is lighted causing the water in the coil 16 to be heated to a sufficiently high temperature to generate a soft wet steam of from 120° to 130° C. The water vapor developed in the pipe 17 is carried over into the pipe 18, and is further heated in the coil 20 to produce sufficient pressure to cause it to be discharged at the nozzle 22. At the same time the container 25 is being heated by the burner 13 and the liquid chemical from container 26, as it is being fed, coming into contact with the heated surface of the vaporizing chamber, produces fumes which are carried off through the pipe 28, the ejector 31 serving to create sufficient suction to carry the heavy vapor along to the discharge nozzle 22. Other chemicals may be added as desired at the points 33 and 34.

If it should be desired to fumigate without the use of steam, the valve T in container 34 is opened, to permit the steam to escape thereby acting in the nature of a by-pass. The flow of compressed air through pie 29 into the system is also shut off in a suitable manner. The hot air passing through pipe 37 as it flows into the delivery portion of pipe 21, develops sufficient pressure to draw the smudge-like fumes through that portion of the pipe 21 back of the connection of the hose 37* with said pipe. When it is desired to spray trees, a suitable hose is connected to coupling 22, and compressed air forced into pipe 29.

Figure 3 illustrates a slight modification in which the water tank 10* is mounted in a horizontal position instead of vertically, as illustrated in Figures 1 and 2. As shown the boiler 10* rests upon the fire box 11 which contains coils 16 and 20, not shown, similar to those of Figure 1, the coil 16 being provided with the extension 17 leading well above the water level in the tank and provided with a branch 19 which connects the branch 17 with the branch 18. In the manner shown in Figure 1, the steam delivery pipe 21 extends from the coil 20 in the manner already described. Also the hot air pipe 24 is shown broken away at the top and the smudge delivery pipe 28 communicating with the pipe 21. The receptacles 33 and 34 are provided with means for introducing chemicals in the manner already described, and the tank 26 is also disposed to direct the smudge-producing chemical into the pipe 27. The compressed air pipe 29 is also shown. The receptacle 34 is provided with a cock T by which the receptacle may be opened to the atmosphere.

The delivery end of the pipe 21 is not shown and the upper part of pipe 24 is broken away. Inasmuch as these parts are the same as illustrated in Figures 1 and 2, further detail illustration and description thereof is considered to be unnecessary.

In practice the apparatus is caused to travel between the rows of vegetation, the plants being covered by the hood so as to bring the chemical-laden fumes into direct contact with them. If the chemical delivered from the container 26 is of a nature to produce an oily smudge, the latter will be inhaled by the insect through the body pores, resulting in almost instant death. The fatal action is hastened by deliverying the smudge at a temperature somewhat at higher than that of the surrounding atmosphere. The higher temperature is obtained either by combining the smudge with steam from the generator 16, or with the hot air passing through pipe 37, or both.

The chemical smoke builds up a very light smudge which will not harm the plants but adheres to them. This adhering substance is impervious to water but on rainy days or at night during a heavy dew, the oxygen emanating from the plants will combine with the hydrogen and emit a noxious odor which is destructive to insect life. By discharging the fumes below the leaves of the plants, the leaves will absorb the chemical through their pores, thus acquiring a plant food and building up a capability of resisting the ravages of insect life. If it should become necessary to attack borers and other insects below the surface of the ground, around the roots of plants, a suitable tool capable of being thrust into the ground, is connected with the steam pipe at coupling 22, and the desired fumes discharged into the ground at the desired points.

The advantages of the invention are apparent. By the method described it is possible to instantly eradicate insects, bugs, weevils, caterpillars, worms, fungus and other destructive agents without injury to the vegetation. An important advantage is that the plants may be fumigated with equal convenience in wet, dry, windy or quiet, or any other kind of weather, and they are provided with a substance which acts as a protection against future onslaughts of the destructive agents of nature.

It is to be understood that although the apparatus hereinabove described is primarily designed for use in treating vegetation to kill insects and the like and to stimulate plant growth, it is not limited to such use, but may be employed for killing noxious weeds and similar vegetation. When used for this latter purpose vegetation destroying chemicals which will enter the cells of the plants are substituted for the chemical substances, above described, which are introduced into the vapors passing through the steam discharge pipe.

Having thus explained the nature of the invention and described an operative manner of constructing and using the same, although without attempting to set forth all of the forms in which it may be made, or all of the forms of its use, what is claimed is:—

1. A fumigating apparatus comprising means for producing a steam vapor, a fumigator coil, means for introducing a chemical into said coil, means for connecting the steam producing means and the fumigator coil whereby a mixture of steam and fumigating material is provided, means for conducting the mixture to a point of delivery, and a common heater for said coil and said steam producing means.

2. A fumigating apparatus of the character described comprising a coil having a terminal extension, means for supplying water to said coil, means for heating the coil, whereby vapor is produced in said extension, means for introducing chemical into the vapor passing through said branch, means for superheating the chemical-laden vapor, and means for conducting said superheated vapor to a point of delivery.

3. A fumigating apparatus of the character described comprising a coil having a terminal extension, means for supplying water to said coil, means for heating the coil, whereby vapor is produced in said extension, means for introducing chemical into the vapor passing through said extension, means for conducting the chemical-laden vapor to a point of delivery, and means for delivering a smudge-like oily vapor simultaneously with the delivery of said chemical-laden vapor.

4. A fumigating apparatus comprising a tank, a fumigator mixing pipe, means introducing chemical thereinto, a water outlet pipe leading from said tank and having a steam vapor delivery branch communicating with said fumigator-mixing pipe, a fumigator-delivery pipe in communication with said mixing pipe, and a common heater for said water pipe and said mixing pipe.

5. A fumigating apparatus comprising a tank having a water outlet pipe, a fumigator-mixing pipe leading from said water outlet pipe, a fumigator-delivery pipe in communication with said mixing pipe, means for introducing chemical into said mixing pipe, and a common heating means for said water outlet pipe and said mixing pipe.

6. A fumigating apparatus comprising a tank having a water outlet pipe provided with a heating coil, a fumigator-mixing pipe into which said heating coil discharges, a fumigator-delivery pipe in communication with said mixing pipe, means for introducing chemical into said mixing pipe, and a common heating means for said coil and said mixing pipe.

7. A fumigating apparatus comprising a tank having a water outlet pipe, a fumigator-mixing pipe leading from the water outlet pipe and provided with a coil, a fumigator-delivery pipe leading from said coil, means for introducing chemical into said mixing pipe, and a common heating means for said water outlet pipe and said coil.

8. A fumigating apparatus comprising a tank having a water outlet pipe provided with a coil, a fumigator-mixing pipe connected with the delivery end of said coil, said mixing pipe being provided with a fumigator coil, a fumigator-delivery pipe leading from said fumigator coil, means for introducing chemical into said mixing pipe, and a common heating means for both coils.

9. A fumigating apparatus comprising a steam generator, a discharge pipe for steam generated thereby, a chemical vaporizing cup open to the atmosphere, means for supplying chemical thereto, means converting said chemical into a smoke-like smudge and a conduit leading from said cup to said discharge pipe.

10. A fumigating apparatus comprising a steam generator, a discharge pipe for steam generated thereby, a chemical vaporizing cup open to the atmosphere, means for supplying chemical thereto, a common heating means for said steam generator and said cup, whereby said chemical is converted into a smoke-like smudge and a conduit leading from said cup to said discharge pipe.

11. A fumigating apparatus comprising means for converting a chemical of oily nature into a smoke-like smudge by heat without combustion of the smudge-producing ingredients, a steam generator, a steam discharge pipe leading from the generator, and a smudge-fumes pipe leading from the smudge-producing means and discharging into said steam discharge pipe.

12. A fumigating apparatus comprising means for converting a chemical of oily nature into a smoke-like smudge by heat without combustion of the smudge-producing ingredients, a steam generator, a steam discharge pipe leading from the generator, a smudge-fumes pipe leading from the smudge-producing means and discharging into said steam discharge pipe, and a common source of heat below the smudge-producing means and said steam generator.

13. A fumigating apparatus comprising a fumigator coil, means supplying steam thereto, means for introducing chemical into the steam before it reaches said coil, a delivery pipe leading from said coil, and means for heating the coil.

14. A fumigating apparatus for treating growing vegetation comprising a tank having a water outlet pipe, a fumigator-delivery pipe leading therefrom and provided with a discharge nozzle, a chemical vaporizing chamber below the tank, means for heating said pipes and said vaporizing chamber, a chemical tank, a supply pipe leading from said tank to said vaporizing chamber, and means for conducting vapor from said chamber to said fumigator-delivery pipe.

15. A fumigating apparatus for treating growing vegetation comprising a tank having a water outlet pipe, means for heating the water, a fumigator-delivery pipe leading from said outlet pipe and provided with a discharge nozzle, a chemical vaporizing chamber, means supplying chemical thereto, a conduit leading from said vaporizing chamber to said fumigator-delivery pipe, and a pressure pipe leading to said vaporizing chamber.

16. A fumigating apparatus for treating growing plants comprising a tank having a water outlet pipe provided with a coil, a fumigator-delivery pipe leading from said pipe and provided with a discharge nozzle a vaporizing chamber supported by said tank above said coil, means for heating said coil and said vaporizing chamber, and means for conducting fumes from said vaporizing chamber to said fumigator-delivery pipe.

17. A fumigating apparatus for treating growing plants comprising a tank having a water outlet provided with a coil, a fumigator-delivery pipe communicating with said water pipe and also provided with a coil concentric with the first mentioned coil, a vapor chamber secured to the tank contiguous to the coils, means for heating said coils and said vaporizing chamber and means for conducting fumes from said vaporizing chamber to said steam pipe.

18. A fumigating apparatus comprising a tank, a water pipe leading therefrom, a fumigator pipe leading from said water pipe and provided with a discharge nozzle, means for heating said water pipe and said fumigator pipe, means for accelerating the passage of fumigating material through the fumigator pipe, and means for introducing fumes into the fumigator pipe contiguous to said accelerating means.

19. A fumigating apparatus comprising a tank having a water outlet pipe, a fumigator pipe leading from said water pipe and provided with a nozzle, means for heating said pipes, an ejector nozzle within the fumigator pipe, and means for introducing fumes into the fumigator pipe contiguous to the ejector nozzle.

20. A fumigating apparatus comprising a tank having a water outlet pipe, a fumigator pipe leading from said water pipe and provided with a nozzle, means for heating said pipes, an ejector nozzle within the fumigator pipe, means for producing smudge-like fumes, means for introducing said smudge-like fumes into the fumigator pipe contiguous to the ejector nozzle, and means for introducing compressed air with said fumes.

21. A fumigating apparatus for treating growing plants comprising a tank having a water outlet pipe, a fumigator pipe communicating with the water outlet pipe and provided with a discharge nozzle, a fumes chamber supported by said tank, a pipe leading from said chamber to said fumigator pipe, and means for accelerating the steam passing through said pipe contiguous to the point of union with said fumes pipe.

22. A fumigating apparatus for treating growing plants comprising a tank having a water outlet pipe, a fumigator pipe communicating with the water outlet pipe and provided with a discharge nozzle, a fumes chamber supported by said tank, a pipe leading from said chamber to said fumigator pipe, and an ejector nozzle in the fumigator pipe contiguous to the point where the same is joined by said fumes pipe.

23. A fumigating apparatus for treating growing plants comprising a tank having a water outlet pipe, a fumigator pipe communicating with the water outlet pipe and provided with a discharge nozzle, means for introducing fumes in said fumigator pipe, and supplemental means for introducing chemicals into said fumigator pipe at points between the said water pipe and said nozzle.

24. A fumigating apparatus comprising a tank, a water outlet pipe leading from the tank and having an external steam generating branch extending above the water level in the tank, a fumigator-mixing pipe leading from said branch at a point above the water level in the tank, means for introducing a chemical substance into said mixing pipe, and a common heating means for said mixing pipe and said steam generating branch.

25. A fumigator apparatus for treating growing vegetation comprising means for creating steam, a fumigator discharge pipe communicating therewith, a hot air pipe communicating with said discharge pipe, and means for introducing a chemical into said discharge pipe.

26. A fumigating apparatus for treating growing vegetation comprising a heater, means heated thereby for creating steam, a fumigator discharge pipe, a hot air pipe positioned over said heater and communicating with the discharge pipe, and means for introducing a chemical into said discharge pipe.

27. A fumigating apparatus for treating growing vegetation comprising a heater, means heated thereby for creating steam, a fumigator discharge pipe, a hot air pipe positioned over said heater and communicating with the discharge pipe, means for introducing a chemical into said discharge pipe, and means for by-passing the steam in said discharge pipe when not required.

In testimony whereof I have hereunto set my hand.

SIGMUND TARNOK.